US007955857B2

(12) United States Patent
Bastide et al.

(10) Patent No.: US 7,955,857 B2
(45) Date of Patent: Jun. 7, 2011

(54) SYNTHESIS OF NANOPARTICLES WITH A CLOSED STRUCTURE OF METAL CHALCOGENS HAVING A LAMELLAR CRYSTALOGRAPHIC STRUCTURE

(75) Inventors: Stéphane Bastide, Paris (FR); Claude Levy-Clement, Bagneux (FR); Dominique Duphil, Igny (FR); Jean-Pascal Borra, Chevreuse (FR)

(73) Assignee: Centre National de la Recherche Scientifique (C.N.R.S.), Paris Cedex (FR)

( * ) Notice: Subject to any disclaimer, the term of this patent is extended or adjusted under 35 U.S.C. 154(b) by 1233 days.

(21) Appl. No.: 10/581,342

(22) PCT Filed: Dec. 6, 2004

(86) PCT No.: PCT/FR2004/003129
§ 371 (c)(1),
(2), (4) Date: Oct. 20, 2006

(87) PCT Pub. No.: WO2005/056479
PCT Pub. Date: Jun. 23, 2005

(65) Prior Publication Data
US 2007/0111319 A1    May 17, 2007

(30) Foreign Application Priority Data

Dec. 4, 2003   (FR) .................................... 03 14259

(51) Int. Cl.
*B22F 9/30* (2006.01)
(52) U.S. Cl. ................ 436/155; 423/592.1; 427/255.29; 75/363
(58) Field of Classification Search ............. 427/255.29; 423/592.1; 436/155; 75/363
See application file for complete search history.

(56) References Cited

U.S. PATENT DOCUMENTS

| 4,689,247 | A | * | 8/1987 | Doty et al. .................. 427/126.1 |
| 5,427,763 | A |   | 6/1995 | Lawton et al. |
| 5,958,361 | A |   | 9/1999 | Laine et al. |
| 6,217,843 | B1 |  | 4/2001 | Homyonfer et al. |
| 2003/0191222 | A1 | * | 10/2003 | Suzuki et al. .................. 524/430 |

FOREIGN PATENT DOCUMENTS

| EP | 0 000 398 A1 | 1/1979 |
| EP | 0 285 339 A1 | 10/1988 |
| JP | 63-310706 | 12/1988 |
| WO | WO 97/44278 | 11/1997 |
| WO | WO 00/66485 | 11/2000 |
| WO | WO 01/04382 | 1/2001 |
| WO | 01/32799 A1 | 5/2001 |
| WO | WO 01/66676 | 9/2001 |

OTHER PUBLICATIONS

International Search Report of PCT/FR2004/003129, mailed Jun. 9, 2005.
Tomazeau et al., "Two Cation Disulfide Layers in the W $xMo_{(1-x)}S2$ Lamellar Solid Solution", Journal of Solid State Chemistry, vol. 160, 2001, pp. 147-155, XP002293665.
Afanasiev et al., "Molybdenum polysulfide hollow microtubules grown at room temperature from solution", Chem. Commun., vol. 12, 2000, pp. 1001-1002, XP002293666.
Lieth et al, "Physics and Chemistry of Materials with Layered Structures, vol. #1: Preparation and crystal growth of materials with layered structures", edited by R.M.A. Lieth, D. Reidel Publishing Company, Dordretch-Holland/Boston-USA, 1977. Chapitre "Transition Metal Dichalcogenides", Table of Contents and pp. 141 and 142.
Vandenberg-Voorhoeve, "Physics and Chemistry of Materials with Layered Structures, vol. #4: Optical and Electrical Properties", edited by P. A. Lee, Springer, 1976. Chapitre "Structural and magnetic properties of layered chalcogenides of the transition elements", Table of Contents and pp. 423-424.
Kolis, "Reaction of Alkali Metal Polyselenides and Polytellurides with Group 6 Metal Carbonyls", Inorganic Experiments, Chap. 4.18, pp. 246-249, ed. J. Derek Woolins. Weinheim; New York, Basel, Cambridge, Tokyo: VCH 1994.
Klepp, "$Na_4SnSe_4$ und $K_4SnSe_4$ zwei neue Selenostannate mit isolierten Anionen", Naturforsch., B: Chem. Sci. (1992), 47(3), p. 411-417.
Klepp, "Alkali Chalcogenometallate(V) mit diskreten Anionen— Synthese und Kristallstrukturen von Na3NbS4, Na3NbSe4, Na3TaSe4, K3VSe4, Cs3NbS4, Cs3TaS4, Cs3VS4, Cs3VSe4, Rb3VS4, Rb3VSe4, Rb3NbS4, Rb3NbSe4, Rb3TaS4, Rb3TaSe4, Na3VOS3, K3NbOSe3, Na3NbOSe, Na2NbOS3 und Na3TaOS3", Gesellschaft Osterreichischer Chemiker, in 10. Osterreichische Chemietage, 2002 (Non-English bibliographic citation only).
Palchik et al, "Microwave-Assisted Preparation, Morphological, and Photoacoustic Studies of the $Na_4SnSe_4$, $K_4Sn_2Se_6$, and $K_4Sn_3Se_8$, Zintl Molecular Sn-Se Oligomers", Journal of Solid State Chemistry 165, 125-130 (2002).
Ruzin et al, "Efficient Synthesis and Properties of Single-Crystalline $[SnTe_4]^{4-}$ Salts", Anorg. Chem., 2006, 632, 1018-1026.
Niewa, "Synthesis and Crystal Structure of Ternary Sulfides $A_3MS_4$ with $A$=Na, Rb and $M$=Nb, Ta", Journal of Solid State Chemistry (1998), vol. 139, No. 2, pp. 404-411.
A. Müller, E. Diemann, R. Jostes, H. Bögge, << Transition Metal Thiometalates: Properties and Significance in Complex and Bioinorganic Chemistry >>, *Angewandte Chemie International Edition in English*, vol. 20 Issue 11, pp. 934-955, Nov. 1981.
Claims of patent application IL 129979 (2009).
Nath et al, "$Mo_{1-x}W_xS_2$ nanotubes and related structures", Chemical Physics Letters 352 (2002) 163-168.
Vollath et al, "Synthesis of nanocrystalline $MoS_2$ and $WS_2$ in a microwave plasma", Materials Letters 35 (1998) 236-244.

* cited by examiner

*Primary Examiner* — In Suk Bullock
*Assistant Examiner* — Paul S Hyun
(74) *Attorney, Agent, or Firm* — Nixon & Vanderhye P.C.

(57) ABSTRACT

The invention relates to a spray pyrolysis method characterized in that it is used in the synthesis of nanoparticles with a closed structure of metal chalcogens having a lamellar crystalographic structure of general formula $M_aX_b$, wherein M represents a metal and X represents a chalcogen, a and b represent the respective proportions of metal and chalcogen, and in that it comprises pyrolysis of a liquid aerosol obtained from a solution of at least one metal precursor (M) and a chalcogen (X), or at least one precursor of said metal (M) and at least one precursor of said chalcogen (X) dissolved in a solvent, said solution being atomized into fine droplets in a suspension in a vector gas.

14 Claims, No Drawings

SYNTHESIS OF NANOPARTICLES WITH A CLOSED STRUCTURE OF METAL CHALCOGENS HAVING A LAMELLAR CRYSTALOGRAPHIC STRUCTURE

This application is the US national phase of international application PCT/FR2004/003129, filed 6 Dec. 2004, which designated the U.S. and claims priority of FR 0314259, filed 4 Dec. 2003, the entire contents of each of which are hereby incorporated by reference.

The present invention relates to the synthesis of nanoparticles with a closed structure of metal chalcogenides having a lamellar crystallographic structure, of the general formula $M_aX_b$, in which M represents a metal and X a chalcogen, a and b representing the respective proportions of metal and chalcogen.

Such chalcogenides, in particular the dichalcogenides of transition metals ($MX_2$), are materials used industrially in the field of lubrication and catalysis (in particular for petroleum hydrodesulfurization).

With regard to dichalcogenides, these have a structure which is hexagonal (for example $2H-MoS_2$) and lamellar, i.e. composed of 001-oriented crystallographic planes which form a structure of $MX_2$ lamellae known as van der Waals lamellae.

An $MX_2$ lamella is composed of a plane of metal atoms (M) sandwiched between two planes of chalcogen atoms (X). Within the lamellae, the atomic bonds between M and X are covalent and thus strong. In contrast, the lamellae are joined together by weak atomic interactions (van der Waals forces between the chalcogen planes), so permitting easy glide perpendicular to the (001) planes, which explains their ability to provide a lubricating action in the solid state.

The tribological properties of solid lubricants such as graphite and dichalcogenides $MX_2$ are of great industrial and technological interest with regard to reducing friction. They are used when liquid lubricants do not work or as additives to enhance the performance of liquid lubricants. $MoS_2$, for example, is well known for its use in the space industry and in a certain number of dispersions in grease, lacquers and as additives in engine oils, in particular in the automotive industry.

In an ultra-vacuum, coatings of pure, stoichiometric $MoS_2$, obtained by solid atomization, have an extremely low coefficient of friction, of the order of $10^{-3}$. In order to allow $MoS_2$ coatings to slip relative to one another, the crystallites are reoriented with their base planes (van der Waals planes) parallel to the direction of sliding.

Although these materials have remarkable anti-friction and slip properties with an extended service life when they are used under vacuum, these lubrication capabilities become poor in the presence of moisture and/or oxygen, so restricting the use thereof in the earth's atmosphere. $MoS_2$ powder has a very short life and a considerably higher coefficient of friction, greater than 0.1, when it is used in moist and/or oxygenated environments. In ambient atmosphere, i.e. with a relative humidity of 50%, the 2H polytype sheets have a tendency to stick to metallic parts due to the presence of pendant bonds, resulting in deterioration and rapid oxidation.

The development of new, better quality and more effective lubricants is a challenge from both an economic and an environmental point of view.

It has recently been shown that $MoS_2$ and $WS_2$ nanoparticles in the form of inorganic fullerenes and nanotubes have tribological properties which are very much better than those of these materials in the form of conventional particles (hexagonal sheets of 2H structure) over a wide range of operating conditions (concentration, load, load/speed ratio, temperature and pressure, etc.).

$MoS_2$ fullerenes have a low coefficient of friction close to 0.04 both under lubrication conditions, as additives in oils, and as coatings under ultra-vacuum conditions. Since the fullerene structure has very few pendant bonds, it provides great chemical stability even when the fullerenes are in contact with ambient air and in particular oxygen. Their round and hollow shape is another favorable factor because it permits deformation without breakage, due to a certain degree of resilience in the structure, and thus better durability over time.

As indicated previously, because they have been discovered only recently, the new forms of $MX_2$ (fullerenes and nanotubes) are not used industrially. Only the conventional (2H) sheet shape, of various dimensions (from 1 to several hundred microns), is widely used in many fields and in different presentations (powder, additives, coating, etc.).

Furthermore, only one method is currently available which allows the synthesis of appreciable quantities of pure inorganic fullerene or $MX_2$ nanotube phases. These products (inorganic fullerenes) have only very recently been introduced commercially and they are available in quantities of the order of one gram, under the name Nanolub™ from the startup company "Applied Materials".

The method used involves reacting nanoparticles of $MO_3$= (M=Mo, W) in sheet or needle form with gaseous hydrogen sulfide or selenide ($H_2S$ and $H_2Se$) at temperatures in excess of 800° C. The reactor which has been developed allows $MO_3$ nanoparticles to be introduced continuously into the furnace, conveyed by an $H_2/N_2$ carrier gas. The carrier gas also has the function of reducing the metal from oxidation state VI to oxidation state IV. It is assumed that the mechanism underlying the formation of the hollow $MX_2$ particles involves the formation of an intermediate amorphous $MX_3$ phase.

Other methods are under development, but at present remain at the experimental, laboratory stage.

Application WO 00/66485, for example, relates to the synthesis of transition metal chalcogenide nanotubes starting from a transition metal or a compound containing said transition metal, for example an oxide, water vapor and a gaseous chalcogen hydride or alternatively molecular hydrogen and a vapor-phase chalcogen.

U.S. Pat. No. 6,217,843 describes a method for the preparation of, on the one hand, metal oxide nanoparticles containing inserted metal particles and, on the other hand, metal-intercalated and/or metal-encaged inorganic fullerene-like structures. These structures are metal chalcogenides obtained from the nanoparticles in question. This method involves heating a group I metal in water vapor or electron-beam evaporating a group I metal in question with water or any other appropriate solvent in the presence of a group II metal salt. The method then involves either recovering the group I metal oxide doped with group II metal or proceeding to subsequent sulfidization.

Patent application WO 0166676 relates to applications of metal chalcogenide fullerenes and the only compound synthesis it mentions is the reaction of a chalcogen hydride on a transition metal oxide.

Patent application WO 0104382 concerns inorganic fullerene-like nanoparticles of metal chalcogenides comprising one or more layers of desired sizes and shapes. These nanoparticles are produced by sonoelectrochemical liquid-phase synthesis.

Patent application WO 9744278 relates to a method of preparing inorganic fullerene-like nanoparticles of a metal, for example transition metal, chalcogenide having the desired size and shape, at high yields and in macroscopic quantities. The method comprises the steps of dispersing solid particles of at least one nonvolatile metal material having the preselected size and shape, heating the solid particles of the nonvolatile metal material in a reducing gaseous atmosphere containing at least one chalcogen for a time and at a temperature sufficient to allow the metal material precursor and the chalcogen to react and form at least one layer of metal chalcogenide covering the surface of the solid particles to form fullerene-like particles, and recovering the thus obtained macroscopic quantities of the metal chalcogenide.

Generally, the major drawbacks of the techniques described in the prior art are associated with the use of the highly toxic gases $H_2S$ and $H_2Se$ and with the small quantities produced, of the order of a few grams per hour. Furthermore, synthesis of the inorganic fullerenes of $MoS_2$ and $WS_2$ inter alia and of all transition metal chalcogenide nanoparticles starting from a solid/gas chemical reaction does not allow the size and shape of the nanoparticles, and in particular of the fullerenes, to be controlled, so affecting the tribological performance of these materials, especially under conditions of elevated load and sliding speed.

The inventors have developed, and this forms the subject matter of the present invention, a method for the synthesis of nanoparticles of metal chalcogenides $M_aX_b$ which overcomes these drawbacks and in particular the problems of toxicity of the compounds required for this synthesis, while simultaneously enabling larger-scale production.

The inventors observed that these various problems could be resolved by implementing a synthesis method based on the pyrolysis of precursors of the materials used.

This technique is mentioned in various documents.

Accordingly, U.S. Pat. No. 5,427,763 reports the synthesis of vanadium dioxide in powder form by spray pyrolysis. This method, however, gives rise to micron-sized powder particles.

Application Wo 01/32799 relates to dispersions of nanoscale particles, in particular of carbon, of metal, of oxides, of carbides or of sulfides of metal/silicone. The technique used in this case is laser pyrolysis.

EP application 0 285 339 describes the use of the spray pyrolysis technique for obtaining dense metal oxide or metal sulfide particles.

The work carried out by the inventors in this field revealed that the spray pyrolysis technique could be used in order to obtain metal derivatives having structures differing from those intended in the above prior art documents.

The invention therefore relates to the use of a spray pyrolysis method in the synthesis of nanoparticles of a particular structure.

It also relates to the uses of the nanoparticles obtained.

A further object of the invention is to provide nanoparticles of a new morphology.

The invention therefore relates to a spray pyrolysis method characterized in that it is applied to the synthesis of nanoparticles with a closed structure of metal chalcogenides having a lamellar crystallographic structure, and comprises the pyrolysis of a liquid aerosol obtained from a solution of at least one precursor of a metal (M) and of a chalcogen (X), or of at least one precursor of said metal (M) and of at least one precursor of said chalcogen (X), dissolved in a solvent, said solution being atomized into fine droplets in suspension in a carrier gas.

More particularly, the invention relates to the use of a pyrolysis method in the synthesis of said nanoparticles, said method comprising the following steps:

formation of a solution of said at least one precursor of a metal and of a chalcogen, or of said at least one precursor of said metal and of said at least one precursor of said chalcogen in a solvent, atomization of said solution in liquid aerosol form by a nebulizer, in particular of the pneumatic or ultrasonic type, through which the carrier gas is flowing, injection of the aerosol into a heated furnace to evaporate the solvent and to react and/or break down said precursor(s) of the metal and of the chalcogen so as to form the nanoparticles, transport by the carrier gas of the nanoparticles to the furnace outlet, and recovery of the nanoparticles at the furnace outlet.

Advantageously, said precursor of the metal and of the chalcogen contains both the metal and the chalcogen.

Such a precursor is in particular of the formula $(A)_cM(X)_d$ in which A is a cation such as $K^+$, $Na^+$ or $NH_4^+$, M is a metal and X a chalcogen, c and d respectively representing the number of cations and chalcogens.

In one embodiment of the invention, said metal is a transition metal. Ti, Zr, Hf, V, Nb, Mo, W, Re, Ta, Co, Ni, Pt, Pd, Cr and Ru may be mentioned.

In another embodiment of the invention, said metal is a metal from group III of the Periodic Table of Elements, such as Ga or In.

In still another embodiment, said metal is a metal from group IV of the Periodic Table of Elements. It is, for example, Sn, Pb or Ge.

In still another embodiment, said metal is a metal from group V of the Periodic Table of Elements, such as Bi.

The chalcogen is selected from among oxygen, sulfur, selenium and tellurium.

In particular, at least one of the precursors of the transition metal and of said chalcogen is a tetrathiometallate or a tetraselenometallate.

The metal of the tetrathiometallate or tetraselenometallate is advantageously selected from molybdenum and tungsten.

Said carrier gas is preferably an inert gas, such as nitrogen and argon, and/or hydrogen.

Said solvent is advantageously a polar solvent.

Still more advantageously, said solvent is selected from water and ethanol, or a mixture thereof.

The spray pyrolysis method as used according to the invention for the synthesis of said nanoparticles comprises in a first phase the atomization, in liquid aerosol form, that is to say in very fine droplets in suspension in a gas, of a solution containing one or more dissolved precursors of the metal and the chalcogen, using a nebulizer through which an inert gas (argon or nitrogen) is flowing. The resultant liquid aerosol is then injected into a furnace adjusted to an elevated temperature (typically of several hundred degrees), so bringing about in the droplets, on the one hand, evaporation of the solvent and, on the other hand, the reaction or the decomposition of the precursors to form $MX_2$ fullerenes or nanotubes. The latter are transported by the inert gas and finally collected at the furnace outlet.

The pyrolysis method used is based on the pyrolysis of a liquid aerosol at elevated temperature. A solution of reaction precursors is atomized with the assistance of an inert gas into micron-scale droplets which are in suspension in the gas (liquid aerosol) and each of which contains a certain quantity of dissolved precursors. This liquid aerosol is injected into a furnace at elevated temperature in which the droplets are converted into particles by direct pyrolysis, so forming a solid aerosol, that is to say particles in suspension in a gas. The solid aerosol is transported by the carrier gas and collected in powder form on a filter at the furnace outlet, or collected by bubbling into a solution which will then be centrifuged.

Numerous physical and chemical processes may occur while the droplets, then the particles, are suspended in the gas phase. These include evaporation of the solvent from the droplets, the onset of crystallization of the solute in the droplet at the solid/liquid interface, reaction or decomposition of the precursors in the particle, diffusion processes in the particle which may give rise inter alia to changes in morphology, the evaporation of volatile species such as metal oxides, the condensation of particles on the furnace walls, the formation of new particles by coagulation of the initial particles.

Generally, operating conditions, in particular with regard to the size of the nanoparticles and/or the temperature and/or the residence time in the furnace, are adjusted so as to optimize the obtainment of closed structures as defined above. Implementation of the above arrangements, alone or in combination, gives rise to inorganic fullerene-like nanoparticles, nanotubes or nanoboxes.

Said nanoboxes are novel products and consequently also fall within the scope of the invention. They are closed, generally hollow rectangular parallelepipeds, namely of essentially rectangular cross-section.

Such nanoboxes, and in general the nanoparticles obtained, are of great interest in the production of various industrial products, such as catalysts, lubricants, in the medical field, or as intercalation agents, for example for hydrogen storage.

The invention will be better understood on reading the detailed description given below by way of example and by reference to FIGS. 1 and 2, which show fullerenes, and to FIGS. 3 and 4 which respectively show nanoboxes in profile viewed from the front.

A solution of ammonium tetrathiometallate or of ammonium tetraselenometallate $MX_4(NH_4)_2$ with M=molybdenum (Mo) or tungsten W at oxidation state VI; X=sulfur (S) or selenium (Se), at a concentration of $4 \times 10^{-4}$ M, is atomized with the assistance of a commercial nebulizer and an inert gas (Ar or $N_2$). A liquid aerosol made up of micron-scale droplets is formed in this manner and transported through a tubular furnace, heated to between 600 and 1050° C., by the inert gas of the liquid aerosol which thus acts as carrier gas. The solution may be prepared from deionized water or an alcohol of the ethanol type for example.

The advantage of using an alcoholic solvent arises from its low surface tension. Its viscosity facilitates the formation of very fine droplets, while its low boiling point enables easy evaporation. A pyrolytic decomposition/reaction of the solution containing the precursor $MX_4 (NH_4)_2$ occurs at elevated temperature.

The atomizer is a glass "spray head" for chromatography as sold by Bioblock Scientific. The optimum pressure for the gas flowing in the atomizer is from 1.2 to 1.4 bar. The Thermolyne-brand tubular furnace can reach a temperature of 1200° C. in 10° C. steps. Various solvents such as water, ethanol, methanol or propanol were used, in which the tetrathiomolybdate $(NH_4)_2MoS_4$ or tetrathiotungstate $(NH_4)_2WS_4$ salt (Aldrich) was dissolved.

Spherical fullerenes of $MoS_2$ were obtained by using the solvent ethanol when atomization is performed at 750 and 900° C.

Spherical particles of 200 nm in diameter are observed by SEM. They are granular in appearance. These same particles are hollow when observed by HRTEM. They are formed of $MoS_2$ lamellae (van der Waals planes) closed on themselves. When the solvent used is distilled water atomized at 750° C., the particles look as if they are formed from an assembly of spherical fullerenes from a few nm to several tens of nm in diameter.

When atomization is performed at higher temperature, for example at 1050° C., the $MoS_2$ fullerenes are of larger size with a diameter of approximately 100 nm.

By way of illustration, FIGS. 1 and 2 show fullerenes synthesized at 900° C. starting from an ethanolic (FIG. 1) and aqueous (FIG. 2) solution of $(NH_4)_2MoS_4$, observed by high resolution transmission electron microscopy (HRTEM).

In the case of $WS_2$ formed from $(NH_4)_2WS_4$ dissolved in ethanol atomized at 750 and 900° C., the SEM images show the formation of parallelepipedal particles and, if applicable, of spherical particles.

Examination by HRTEM reveals that these particles, as shown in FIGS. 3 and 4, are completely enclosed by well-aligned lamellae of $WS_2$. They contain curved lamellae of $WS_2$.

The present invention exhibits the advantage of making it possible to manufacture a wide variety of materials in an advantageous manner, and at low cost, given the small number of operations to be carried out. The method of the invention makes it possible to obtain particles of well-defined dimensions by controlling the size of the droplets generated by the atomizer and also to form dense or porous particles by controlling the evaporation dynamics of the droplets.

The experimental conditions of the method according to the invention thus provide control of the size, the morphology and the degree of crystallinity of the nanoparticles formed and thus of their physical, mechanical, optical, electronic and catalytic properties.

The invention claimed is:

1. A spray pyrolysis method for the synthesis of closed-structure nanoparticles of metal chalcogenides having a lamellar crystallographic structure, of the general formula (I) $M_aX_b$, said method comprising the steps of:
   (a) providing a solution of at least one precursor having the formula (II) $(A)_cM(X)_d$ dissolved in a solvent,
   (b) providing a liquid aerosol by atomizing the solution obtained in step a) into fine droplets in suspension in an inert carrier gas, and
   (c) pyrolyzing the liquid aerosol obtained in step c); wherein, in formulas (I) and (II):
   A represents a cation,
   M represents a transition metal or a metal from group III, IV or V of the periodic table of the elements,
   X represents a chalcogen selected from oxygen, sulfur, selenium and tellurium, a and b each represents the proportion of metal and of chalcogen, respectively, in formula (I),
   c and d each represents the proportion of cations and of chalcogens, respectively, in formula (II),
   M and X represent a metal and a chalcogen, respectively, of a metal chalcogenide $M_aX_b$ having a lamellar crystallographic structure.

2. The method as claimed in claim 1, said method comprising the following steps:
   forming said solution of said at least one precursor having the formula (II) in a solvent,
   atomizing said solution in liquid aerosol form by a nebulizer, through which the carrier gas is flowing,
   injecting the aerosol into a heated furnace to evaporate the solvent and to react and/or break down said at least one precursor having the formula (II) so as to form the nanoparticles,
   transporting the nanoparticles to the furnace outlet using the carrier gas, and recovering the nanoparticles at the furnace outlet.

3. The method as claimed in claim 1, wherein A is $K^+$, $Na^+$ or $NH_4^+$.

4. The method as claimed in claim 1, wherein M is a transition metal selected from among Ti, Zr, Hf, V, Nb, Ta, Mo, W, Re, Co, Ni, Pt, Pd, Cr and Ru.

5. The method as claimed in claim 1, wherein M is Ga or In.

6. The method as claimed in claim 1, wherein M is Sn, Pb or Ge.

7. The method as claimed in claim 1, wherein M is Bi.

8. The method as claimed in claim 3, wherein said at least one precursor of formula (II) is a tetrathiometallate or a tetraselenometallate.

9. The method as claimed in claim 8, wherein M is molybdenum or tungsten.

10. The method as claimed in claim 1, wherein said carrier gas is an inert gas selected from nitrogen and argon and/or hydrogen.

11. The method as claimed in claim 1, wherein said solvent is a polar solvent.

12. The method as claimed in claim 1, wherein said nanoparticles are nanotubes, fullerenes and/or nanoboxes.

13. The method as claimed in claim 2, wherein the nebulizer is a pneumatic or ultrasonic type nebulizer.

14. the method as claimed in claim 11, wherein the solvent is water, ethanol, or a mixture thereof.

\* \* \* \* \*